Figure 4:
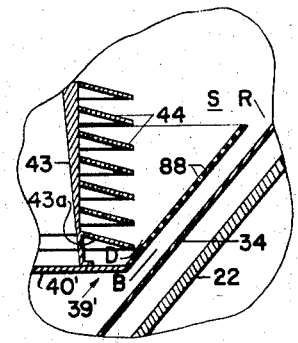

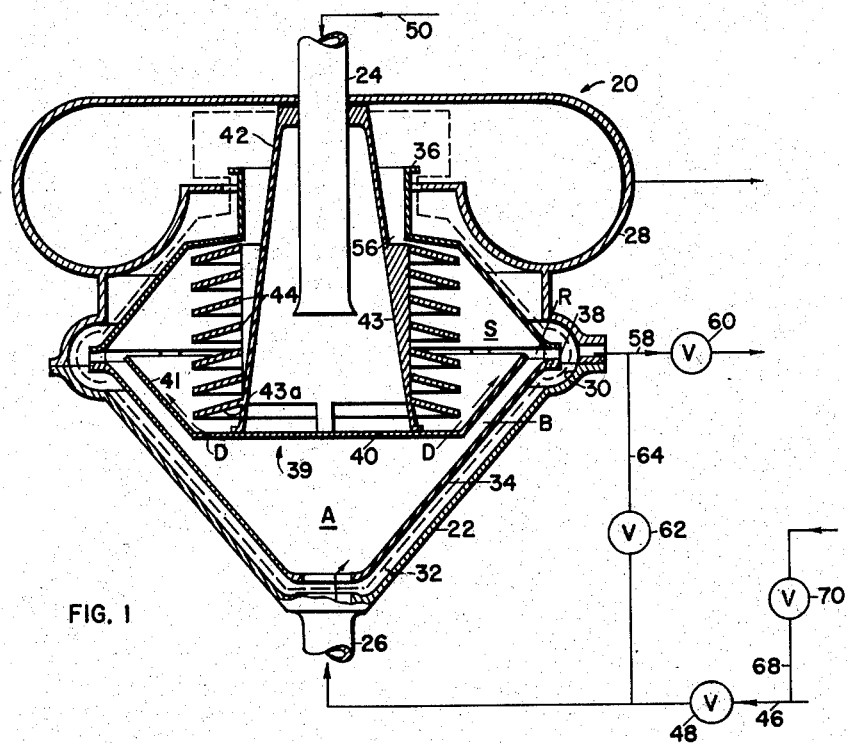

Jan. 20, 1959         H. H. GEISSLER         2,869,779
METHOD OF WITHDRAWING A MIXTURE OF FEED LIQUOR
AND CARRIER LIQUID FROM A CENTRIFUGE
Filed April 25, 1955         2 Sheets-Sheet 2

INVENTOR:
HUGO H. GEISSLER
BY: Alan C. Batchelar.
HIS AGENT ated Jan. 20, 1959

2,869,779

METHOD OF WITHDRAWING A MIXTURE OF FEED LIQUOR AND CARRIER LIQUID FROM A CENTRIFUGE

Hugo H. Geissler, Shelton, N. J., assignor to Shell Development Company, New York, N. Y., a corporation of Delaware Application April 25, 1955, Serial No. 503,547

4 Claims. (Cl. 233—14)

This invention relates to refining methods and more particularly to methods for effecting the separation of solid particulate material from a fluid in which such material is dispersed or suspended.

It is well known to persons skilled in the art that materials of different specific gravities can be efficiently separated by means of centrifugal force and various apparatus, commonly known as centrifugal separators or centrifuges, have been devised and widely utilized in diverse industrial applications for this purpose.

Industrial centrifuges of the type with which the present invention is concerned comprise, generally, a vessel or bowl which is rotatable at high speeds and means for introducing into and removing from the bowl either continuously or in successive batches, the materials to be separated. In addition, various centrifuges in certain specific applications, e. g., where a particulate solid is to be removed from a fluid, employ an additional "wash" liquid which acts as a receiver for the solid matter and which, like the feed liquor, is introduced into and removed from the bowl in a continuous flow or in batches.

In the operation of such centrifuges the materials to be separated, e. g., oil containing suspended wax particles, are subjected to relatively high centrifugal forces in the bowl of the separator. While under rotation, by virtue of their differing specific gravities, the materials arrange themselves in delineated layers or strata within the bowl with the heavier material forming the outermost layer at a maximum radial distance from the center of rotation and the lighter material forming a second inner layer. Where a wash liquid is used it is generally a liquid of higher specific gravity than the feed liquor and therefore it assumes the outermost position in the bowl and the wax particles leaving the oil accumulate and form an intermediate layer at the interface between the oil and wash liquid strata.

Heretofore various methods and apparatus have been proposed in an effort to obtain the highest possible degree of separation and purity of the materials handled as well as for efficiently delivering them to and withdrawing them from the centrifuging bowl in order to meet the requirements of commercial production processes requiring material separation.

The novel method contemplated by this invention is directed to the purification of liquids by the removal therefrom of particulate solid impurities dispersed, suspended or otherwise contained therein such, for example, as the separation of minute particles of skin and seeds from olive oil; carbonaceous matter from a benzene solution of chlorinated hydrocarbons such as Aldrin; fuller's earth and lime from light petroleum oils; suspensions from heptane; etc.

In the novel method the wash liquid and the feed liquor, i. e., the liquor from which suspensions are to be separated are directed to the centrifuging apparatus in such a manner that the wash liquid immediately establishes a constantly discharging carrier layer. Furthermore, the wash liquid is so selected and/or treated prior to use as to establish a predetermined relation between the respective specific gravities of the wash and feed liquids whereby heavy concentrations of impurities in the feed liquor are, in a continuous cycle, centrifugally separated therefrom and exhausted from the centrifugal apparatus in suspension in the wash liquid as hereinafter more fully explained.

The general and basic object of this invention is the provision of novel methods of material separation.

Another object of this invention is to provide improved methods of centrifugally separating particulate solid impurities from liquids.

A further object of this invention is the provision of improved methods of operating centrifugal separators.

An additional object of this invention is to provide an improved method of centrifugally removing and discharging particulate solid impurities in liquids by means of a novel relation between the liquid being purified and the wash liquid utilized.

A still further object of this invention is to provide a novel method of centrifugally purifying liquids by removal of particulate solid impurities therefrom by use of a wash liquid of selected and/or controlled specific gravity which is immiscible with the feed liquid.

It is a more specific object of this invention to provide a novel method of operating centrifugal separators to purify liquids of included particulate solid impurities by removing and discharging such impurities in a continuous cycle with a wash liquor having a selected and/or controlled specific gravity exceeding that of said liquids.

Another important object of the invention is to provide a novel method of centrifugal purification of liquids which gives optimum results with regard to the yield and purity of the liquid, the cost of operation of the system, the volume of material handled and the "downtime" required for service and maintenance of the apparatus employed.

Figure 2:
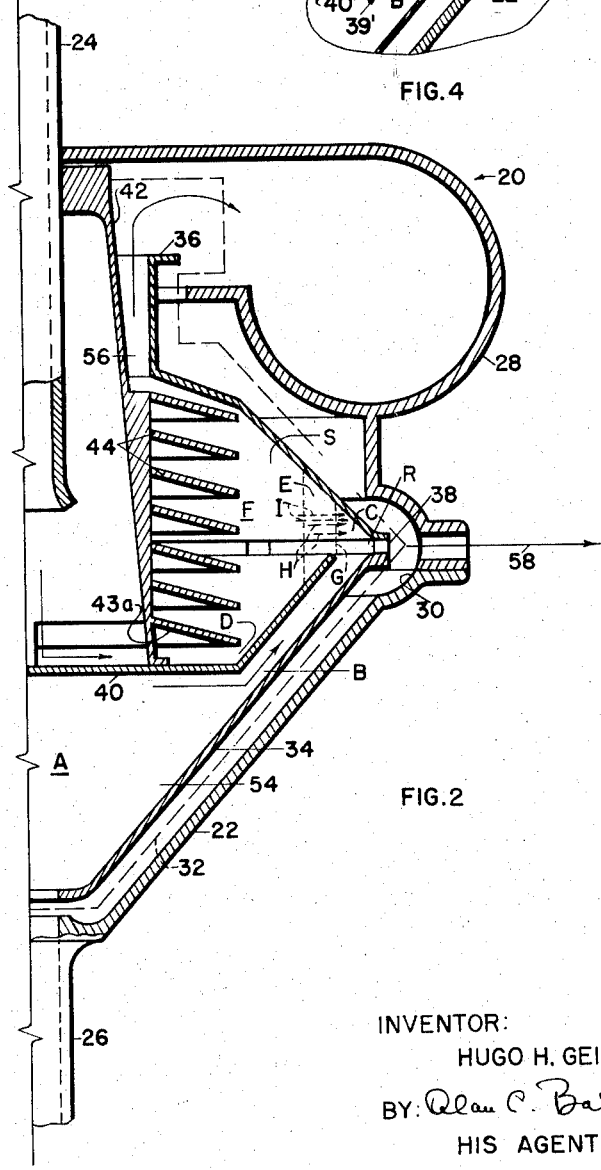

These and other subordinate objects will become apparent to those conversant with the art from the following description and subjoined claims read in connection with the annexed drawings, wherein:

Figure 1 is a schematic diagram of a centrifugal separating apparatus illustrating the manner in which one form of the novel method embraced by this invention may be carried on;

Figure 2 is an enlarged fragmentary view of the apparatus shown in Figure 1, illustrating the manner in which material separation is effected by operation thereof according to the method of the present invention; and Figure 3 is a schematic diagram similar to Figure 1, illustrating the same apparatus slightly modified in order to carry on another form of the method embraced by the present invention.

Figure 4 is a fragmentary view showing a modified form of impeller which may be used in the apparatus shown in any of the foregoing figures.

In order to facilitate and clarify the description of the novel methods devised, resort will be had to the basic structural details of a representative type of centrifuging apparatus, but it will be understood that the method may be practiced in conjunciton with any centrifuge of the same or similar general construction and operation or which can be modified to perform the esesntial steps of the methods disclosed.

Referring then to Figure 1, a conventional centrifugal apparatus of the continuous feed type is indicated generally by reference numeral 20. In its broadest structural aspects, centrifuge 20 comprises a stationary outer housing 22; a feed liquor inlet 24; a wash liquid inlet 26; an overflow volute 28 for receiving one of the separated materials; and an underflow volute 30 for receiving another of the separated materials. A centrifuging vessel or bowl assembly (enclosed within broken line 32 for ease of designation) is coaxially mounted within housing 22 for high speed rotation and comprises a shell 34, a ring dam or weir 36 for directing material to volute 28, and a plurality of equiangularly disposed peripheral nozzles 38 at the maximum diameter of shell 34, for directing material to underflow volute 30. Coaxially disposed within and rotatable with shell 34 as a unit is an impeller indicated generally at 39 and comprising an annular deflector member 40 having upwardly and outwardly sloping side walls 41; a feed member 42 having downwardly and outwardly flared side walls 43 and a bottom flange 43a; and a plurality of axially spaced frusto-conical, annular discs 44 which impart angular velocity to the materials in the vessel 32. The shell 34 and impeller 39 cooperate to define an annular separating chamber "S" the outermost portion of which, immediately adjacent nozzles 38 is known in the art as a "racing chamber" and is designated in the drawings by reference character "R." The apparatus briefly described above is substantially identical to that disclosed in United Stated Letters Patent 2,559,453 to J. L. Merrill et al., to which reference may be had for further details of construction if desired. However, as will become apparent as the description proceeds, the methods discovered are not in their broader aspects restricted to use with a specific apparatus.

For purposes of example, one form of the method will now be described as it has been applied to the purification of olive oil.

In the manufacture of olive oil, the olives are subjected to a series of pressing operations which express the oil from the fruit. The pressing operations, however, inevitably result in the presence in the oil of various sized foreign particles such as broken seeds and sections of rind which must be eliminated for obvious commercial reasons. While the large particles are easily and conveniently removed from the liquid fraction by suitable and well known straining or screening procedures, these are wholly ineffective to separate out the smaller particles which are equally objectionable in a high quality product. These particles which remain as suspensions or dispersions in the oil are of minute, almost microscopic dimensions, and resist all commercially feasible methods of removal. Filtration and settling are intolerably slow for mass production operations and have the additional disadvantage that the filtrate or settled residue as the case may be contains a large content of expensive oil. Ordinary centrifuging methods have also proved unsatisfactory in regard to reclaiming a maximum yield of oil with a minimum of waste and also for the reasons hereinabove explained.

In the application of the novel method disclosed herein to the problem of purifying olive oil it has been found that water, which of course is immiscible with and slightly heavier than the oil, which has a specific gravity of approximately .918, is ideally suited as a wash liquid.

Referring to Figures 1 and 2, the wash liquid, in this case water, is supplied in a continuous flow through conduit 46, automatic or manual control valve 48 and wash liquid inlet 26 of the centrifuging apparatus and flows upwardly through the bottom of shell 34 into space "A" in the bowl assembly 32 defined between the shell 34 and member 40. In normal operation, the bowl assembly 32 is whirling at high rotational speeds and consequently, the wash liquid issuing from inlet 26 into the space "A" flows radially outwardly and upwardly through the annular space B between the parallel inclined peripheral walls of shell 34 and member 40. Preferably space B is provided with a plurality of parallel, circumferentially spaced radial vanes, nozzles or similar flow duct-defining means (not shown) which positively impart the rotational velocity of the bowl assembly to the wash liquid to increase the centrifugal force exerted thereon and thus increase its velocity through space B. As the controlled feed of wash liquid continues, under the influence of centrifugal force it immediately seeks the zone of greatest diameter of shell 34 (viz. racing chamber "R"), and there forms an annular stratum or "carrier layer" "C" (Figure 2).

Meanwhile, feed liquor, in this instance olive oil containing impurities in the form of particulate solids as explained above, is fed in a continuous flow through conduit 50 and feed liquor inlet 24 of the centrifuge and enters bowl assembly 32 within member 42. The olive oil feed passes downwardly to the bottom of conical member 40 from which it picks up angular velocity and passes upwardly and radially outward through an annular space D, defined between member 40 and the bottom flange 43a of member 42 to substantially fill that portion of the separating chamber or zone "S," which is not already occupied by the carrier layer "C" of wash liquid. In racing chamber "R" it will be understood that since the wash liquid has the higher specific gravity it forms and retains its position as the outermost layer, i. e., carrier layer C, and as clearly seen in Figure 2, the olive oil feed remains in the zone of separating chambers radially inward of the wash liquid carrier layer.

However, it will be noted by reference to Figure 2, that two layers, viz., E and F exist inwardly of carrier layer C. Layer E, contiguous with carrier layer C along the interface indicated as G, is a layer of oil containing a relatively higher concentration of impurities with respect to both the incoming and the discharging oil for a reason hereinafter explained. Radially inward of layer E is layer F which is comprised of oil having the lowest concentration of impurities. From a consideration of the effects of centrifugal force on the liquids within the bowl assembly 32 and particularly the oil in the upper portion of the shell 34, i. e., above the bottom flange of member 42, it will be understood that, due to their greater density, the particulate solid impurities in the oil move radially away from the axis of rotation of the bowl and therefore, the gradient of impurity concentration increases with the radial distance from said axis and since the density of the oil is a function of the impurity concentration, the density gradient increases likewise. Thus the oil closest to carrier layer C contains the highest concentration of impurities, is therefore denser than the remaining oil although less dense than the water, and forms the layer E. Although the specific gravity of the impurities in the feed oil is higher than that of the oil itself, it is equal to or only very slightly less than the specific gravity of the wash liquid. Consequently under the influence of centrifugal force, these particles are propelled into the wash stratum C, as indicated by dashed arrows "H" in Figure 2 and become suspended therein.

The underflow nozzles 38, which discharge to volute 30, are of a size to permit controlled discharge of the wash liquid at a lower rate than the total flow of liquids entering the centrifuge. As a result the purified feed liquor layer F builds up until the entire volume between and around separating discs 44 is filled. The sliding action over discs 44 and angular velocity imparted by the discs further separates the oil according to specific gravity (and, therefore, purity), and forms strata on the discs, the heavier suspensions gravitating toward the disc surface while the olive oil remains above the particles. In a continuous flow, the oil is progressively purified and as its density decreases, it moves progressively inwardly passing over discs 44 and then upwardly through passages 56 over ring dam or weir 36 to overflow volute 28, while the particles move outwardly into the carrier layer C, as indicated by the dashed arrows "I" in Figure 2.

As heretofore pointed out, the particulate matter is carried off suspended in the wash liquid and in this condition does not coagulate, settle, or accumulate at the periphery of the bowl around the nozzles. Therefore, the wash liquid constantly discharging from nozzles 38 will effectively carry off even a very high concentration of particles from the bowl.

The wash liquid discharging through nozzles 38 passes to underflow volute 30 and then to discharge conduit 58. When the wash is carrying a very high concentration of removed impurities it is allowed to pass through conduit 58 to suitable waste collecting tanks (not shown), but when the wash is not saturated with suspensions and particularly when the wash liquid is of such a nature as to warrant conservation, for example, after having been treated in the manner presently to be described, a portion of the wash liquid may be recirculated to utilize it to its fullest capacity. This may be accomplished by opening valve 62 so that whatever portion desired of the wash is recirculated to inlet 26 along with the fresh wash in conduit 46.

From the foregoing description of one form of the novel method devised, it will be appreciated that the wash liquid must have, as one essential characteristic, a specific gravity somewhat in excess of the liquid to be purified and approximately equal to or only very slightly less than that of the particulate solid impurities to be extracted therefrom. In addition the wash liquid should be inexpensive, readily available in necessary quantities, preferably non-toxic, non-corrosive, non-flammable, and finally, it should be completely immiscible with the feed liquor being handled. This latter qualification is of prime importance, particularly when dealing with large volumes of relatively expensive feed liquor as is frequently the case in chemical, food processing and similar industries utilizing mass production techniques. Because of their mutual immiscibility, intermixture and discharge of feed liquor with the wash liquid is eliminated and because of the higher specific gravity of the wash liquid and the manner in which it is introduced, i. e., through passage B to racing chamber R immediately adjacent discharge nozzles 38, the formation of carrier layer "C," which also acts as a barrier against escape of feed liquor through the nozzles, is accelerated and assured.

In the foregoing description of an exemplary embodiment of the method devised, it so occurs that, in the purification of olive oil, water is an ideal wash liquid in that it fulfills all the qualifications and desiderata hereinbefore mentioned, viz., it is inexpensive, available in large quantities, non-toxic, non-flammable, and non-corrosive to the materials in which it would come in contact in the centrifuge. Furthermore, it is of the proper specific gravity relative to both the oil and the impurities therein and it is completely immiscible with the oil. However, despite its general suitability, water, at least in its natural state, cannot be used as a wash liquid in many cases because it does not fulfill the all-important requirement regarding specific gravity relative to whatever feed liquor it might be necessary to purify.

As an example of such a situation, in the manufacture of certain chemical compounds it is necessary in one stage of the production procedure that a benzene solution of chlorine-substituted hydrocarbons be purified to remove a suspension of minute carbonaceous particles therefrom. However, such a solution has a specific gravity of 1.25 or approximately 20% greater than that of water, and, therefore, despite the fact that water, being immiscible with the benzene solvent, would otherwise be an ideal wash liquid it cannot be used because it is less dense than the benzene solution and therefore would not form a suitable carrier layer. The water would form a layer internally rather than externally of the benzene layer where it would not be in a position to receive separated particles in suspension and preclude escape of the feed liquor through the discharge nozzles.

However, by use of a modified form of the novel method devised, it is still possible to use water as a wash and carrier liquid as will now be explained in conjunction with the particular problem of separating carbonaceous suspensions from benzene solutions of chlorinated hydrocarbons mentioned above. Generally stated, this is done by controlling the specific gravity of the water by the addition of adulterants, or solutes, thereto which may be selected as required to fit the particular situation. In the case of the benzene solution resorted to as an example, the adulterant or additives may be water-soluble salts, sugars, or other water-soluble materials, and may be added, for example, as concentrated solutions. For example, calcium chloride ($CaCl_2$), sodium hydroxide ($NaOH$), sucrose ($C_{12}H_{24}O_{12}$), glycerine ($C_3H_8O_3$), or urea ($CH_4N_2O$) may be employed. Of the alternatives mentioned, calcium chloride is especially suitable. These or any other suitable additive, introduced into the water in sufficient quantities produces a resulting wash liquid having the desired specific gravity, which should be sufficiently high, e. g., 1.27–1.30, to qualify for use with the benzene solution. It will be understood, of course, that the amount of adulterant utilized in any specific application depends on the nature of the adulterant, the quantity of wash liquid required, and the concentration of the additive solution. It is preferred that the chemical additives be insoluble in the feed liquor.

Referring once again to Figure 1, the additive may be supplied by means of a line 68 connected to wash inlet conduit 46 and provided with a suitable valve 70 for controlling the rate of flow of the additive to the wash liquid. Valve 70 may be calibrated for manual setting or provided with automatic means responsive to the density of the wash liquid for controlling the rate of addition. Aside from the step of regulating the specific gravity of the wash liquor, the general operation of the centrifuge and subsequent steps of the method are identical with those described above in conjunction with the purification of olive oil. It has been found in practice that with the novel treated wash liquid method of this invention the loss of the relatively expensive benzene solution could be and was reduced by 96% over prior art settling tank methods of separation.

Referring again to Figure 2, the sharpness of definition of the interface G between carrier layer C and intermediate layer E depends primarily on the degree of miscibility or immiscibility and the difference in the relative specific gravities of the liquids in contact. In the case of such highly immiscible liquids as oil and water the interface or boundary between the two layers is quite sharply defined but as the degree of miscibility increases, and the difference in specific gravities decreases an increasing amount of interdiffusion takes place between the two liquids. Where there is any material extent of interdiffusion between layers C and D, the possibility arises of loss of a substantial amount of the feed liquor along with the wash liquid and impurities as the latter are discharged. To forestall such an undesirable condition which obviously reduces the yield of end product, a somewhat modified form of the basic method described hereinabove is advantageously resorted to.

Use of the modified form of method requires a slightly different type of apparatus or double overflow return type centrifuge as illustrated in Figure 3 to which reference will be had hereinafter. The modified form of method involves the reprocessing of the intermediate layer E which, as already has been explained, contains a high concentration of impurities but also comprises a substantial amount of entrapped feed liquor.

In order to accomplish such reprocessing, the rotating bowl assembly 32 is provided with an upwardly extending passage 72 defined between a wall 74 of shell 34 and a baffle 76 mounted for rotation with the bowl assembly 32.

The lower end of the passage 72 opens into zone of separation S while its upper end is provided with an overflow weir 78 over which liquid flows into a chamber 80 which surrounds the weir. During rotation of bowl assembly 32 the interdiffused portion of layers C and D is constantly withdrawn by rotating baffle 76 and is carried upwardly through passage 72 to overflow into chamber 80 from which it is carried back to the centrifuge by means of conduit 82 and wash inlet 26, a valve 83 being provided to allow manual or automatic adjustment of the quantity of liquid recirculated. The recirculated intermixture of wash liquid, feed liquor and impurities entering wash inlet 26 passes upwardly through passage B to the carrier layer and is subjected to a repetition of the centrifuging action during which particles of impurities are centrifuged outwardly while the entrapped feed liquor passes inwardly eventually to discharge to volute 28 by way of passage 56. Thus, any feed liquor entrapped in or intermixed with wash liquid is subjected to an additional centrifuging to assure a maximum yield of purified feed liquor. The reprocessing of the intermixed liquids is particularly important when dealing with feed liquors that are expensive or in short supply.

If desired, a portion of the intermixed feed and wash liquid tapped from chamber 80 for recirculation may be reintroduced into the centrifuge through feed inlet 24 along with the fresh feed liquor as well as through wash inlet 26. This may be accomplished by means of a conduit 84, in communication with conduits 82 and 24, respectively, and having a flow control valve 86. The recirculated liquids entering inlet 24 pass downwardly to the bottom of conical member 40, pick up angular velocity and pass outwardly through passages D into the separating zone S. As the angular velocity increases, the wash liquid being of greater specific gravity than the feed liquor will uniformly pass through the feed liquor, to carry particles suspended in the feed liquor outwardly into the carrier layer established by the unmixed wash liquid entering through inlet 26. The conjunctive feeding of both wash and feed liquid through inlet 24 in this manner permits a countercurrent flow of wash and feed relative to each other in the separating zone with the wash liquid passing outwardly to the carrier zone and the feed liquor passing inwardly through passage 56 to volute 28. This results in a more effective washing and purifying of the feed liquor which is particularly advantageous where the particles suspended in the feed liquor are unusually minute and of a relatively low concentration.

If desired, the novel methods hereinabove disclosed may be employed in conjunction with a centrifuging apparatus having an impeller 39' wherein the deflector member 40' contains a plurality of equiangularly spaced apertures 88 in the upwardly, outwardly sloping side walls thereof, as shown in Figure 4.

The function of the apertures is to permit a portion of the incoming wash liquid to pass therethrough and enter the separating zone S of the bowl in a region inwardly from the restricted entrance to the zone where the carrier stratum is formed. In this manner, it is possible to accomplish a blocking of the feed liquor before it reaches an area of high centrifugal effect. The wash liquid passing through impeller holes 88 also assists in maintaining fluidity of the concentrated solids. The optimum number and location of apertures varies for different applications and may be determined empirically.

From the foregoing description of the novel methods devised it will be readily seen that the delivery of a wash liquid of greater specific gravity than and immiscible with a feed liquor to be purified to a zone adjacent the peripheral discharge nozzles of the centrifuge apparatus permits the immediate establishment of a carrier stratum which acts as a barrier to prevent unwanted discharge or loss of any feed liquor and also receives particles centrifuged from the feed liquor. Since intermixture and escape of the feed liquor in the wash liquid is prevented, it can only pass in its purified state to volute 28 while the wash liquid in the carrier zone which constantly receives centrifugally separated particles continuously discharges through nozzles 38, volute 30 and conduit 58 for discard or recirculation. The constantly discharging wash liquid is capable of carrying a high concentration of particles suspended therein, heretofore impossible by prior art methods, and thereby prevents any clogging of the apparatus and assures a maximum uncontaminated yield of purified feed liquid. Additionally, the use in the method of step of treating the wash liquid with additives to control its specific gravity relative to the feed liquid to be purified permits the use of water or some other wash liquid selected on the basis of low cost availability and other desirable properties without regard to specific gravity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

I claim as my invention:

1. A method of purifying a feed liquor by removing solid suspensions of slightly greater specific gravity therefrom in a centrifuge having peripheral discharge means which comprises, continuously feeding a carrier liquid of greater specific gravity than said feed liquor and suspensions to the centrifuge to immediately form a stratum of carrier liquid adjacent the discharge means thereof; directing said feed liquor to the centrifuge to form a second stratum contiguous to said first stratum of carrier liquid; purifying said feed liquid by centrifugally transferring the suspensions therefrom to the carrier liquid in said first stratum; continuously discharging carrier liquid containing suspensions from the carrier liquid stratum; continuously separately discharging purified feed liquor; and continuously and separately withdrawing an intermixture of feed liquor and carrier liquid at the interface of said strata and recirculating the intermixture withdrawn to be further centrifuged to separate any trapped feed liquor from the recirculated intermixture of carrier liquid and feed liquor to assure a maximum yield of purified feed liquor.

2. A method of purifying olive oil by removing solid suspensions of slightly greater specific gravity therefrom in a centrifuge having peripheral discharge means which comprises continuously feeding water to the centrifuge to immediately form a stratum of water adjacent the discharge means thereof; directing said olive oil to the centrifuge to form a second stratum contiguous to said stratum of water; purifying said olive oil by centrifugally transferring the suspensions therefrom to water; continuously discharging water suspensions from the water stratum; continuously separately discharging purified olive oil; and continuously and separately withdrawing an intermixture of olive oil and water at the interface of said strata and recirculating the intermixture withdrawn to be further centrifuged to separate any trapped olive oil from the recirculated intermixture of water and olive oil to assure a maximum yield of olive oil.

3. A method of purifying a benzene solution of chlorinated hydrocarbons by removing carbonaceous suspensions of slightly greater specific gravity therefrom in a centrifuge having peripheral discharge means which comprises continuously feeding water which has been treated with an additive to increase its specific gravity to a value in excess of that of the benzene solution to the centrifuge to immediately form a stratum of water adjacent the discharge means thereof; directing said benzene solution to the centrifuge to form a second stratum contiguous to said first stratum of water; purifying said benzene solution by centrifugally transferring the suspensions therefrom to the water in said first stratum; continuously discharging water containing suspensions from the water stratum; continuously separately discharging purified benzene solution of chlorinated hydrocarbons; and continuously and separately withdrawing an intermixture of benzene and carrier liquid at the interface of said strata and recircling the intermixture withdrawn to be further centrifuged to separate any trapped benzene solution from the recirculated intermixture of water and benzene to assure a maximum yield of pure benzene.

4. A method of purifying a feed liquor by removing solid suspensions of slightly greater specific gravity therefrom in a centrifuge having peripheral discharge means which comprises feeding a carrier liquid of greater specific gravity than said feed liquor and suspensions to the centrifuge to form a stratum of carrier liquid adjacent the discharge means thereof; directing said feed liquor to the centrifuge to form a second stratum contiguous to said first stratum of carrier liquid; purifying said feed liquid by centrifugally transferring the suspensions therefrom to the carrier liquid in said first stratum; discharging carrier liquid containing suspensions from the carrier liquid stratum; separately discharging purified feed liquor; and separately withdrawing an intermixture of feed liquor and carrier liquid at the interface of said strata and recirculating the intermixture withdrawn to be further centrifuged to separate any trapped feed liquor from the recirculated intermixture of carrier liquid and feed liquor to assure a maximum yield of purified feed liquor.

References Cited in the file of this patent

UNITED STATES PATENTS

| | | |
|---|---|---|
| 1,351,265 | Sharples | Aug. 31, 1920 |
| 1,373,219 | Beach | Mar. 29, 1921 |
| 1,492,168 | Hapgood | Apr. 29, 1924 |
| 1,866,638 | Fawcett | July 12, 1932 |

FOREIGN PATENTS

| | | |
|---|---|---|
| 858,820 | Germany | Dec. 8, 1952 |